United States Patent Office 3,499,648
Patented Mar. 10, 1970

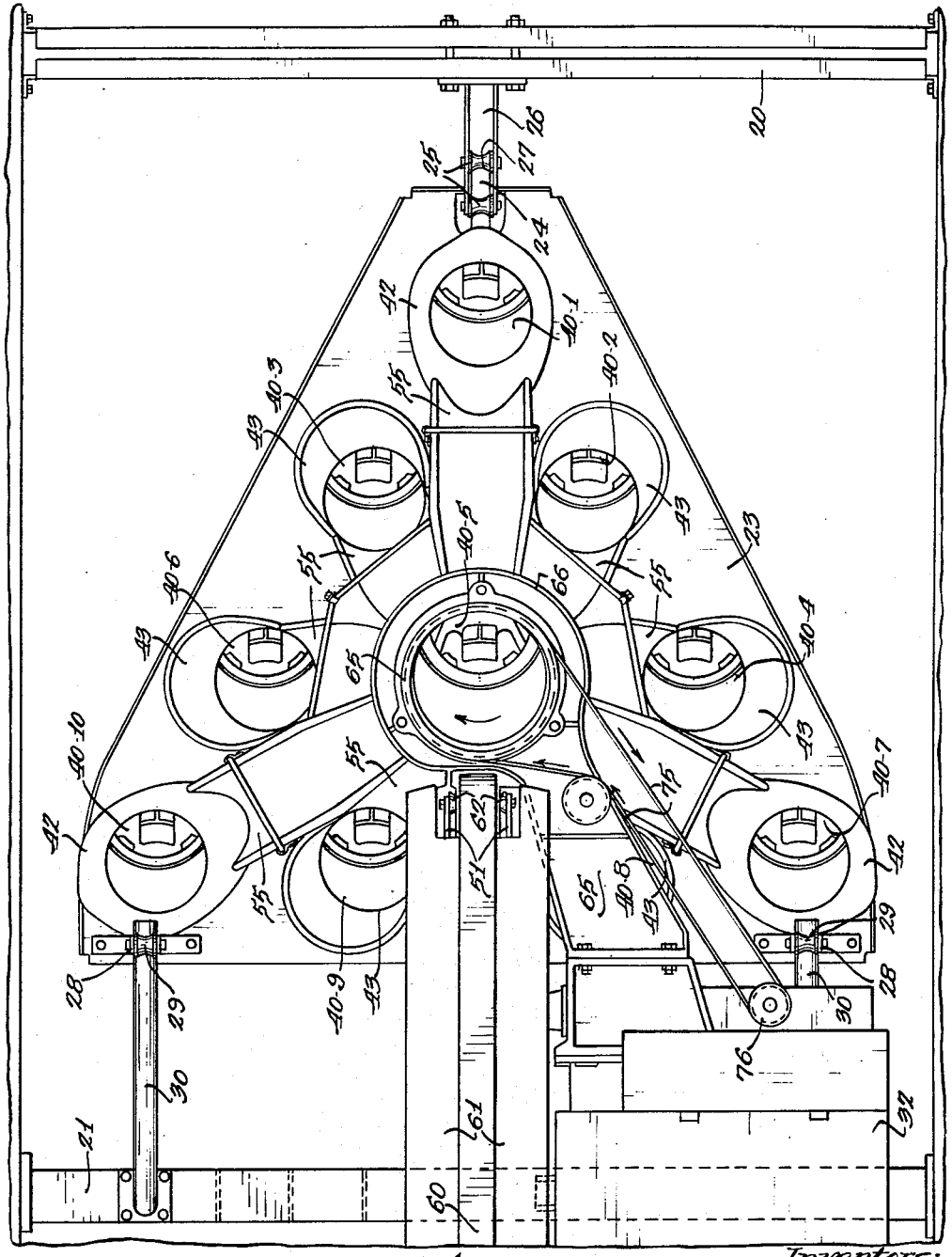

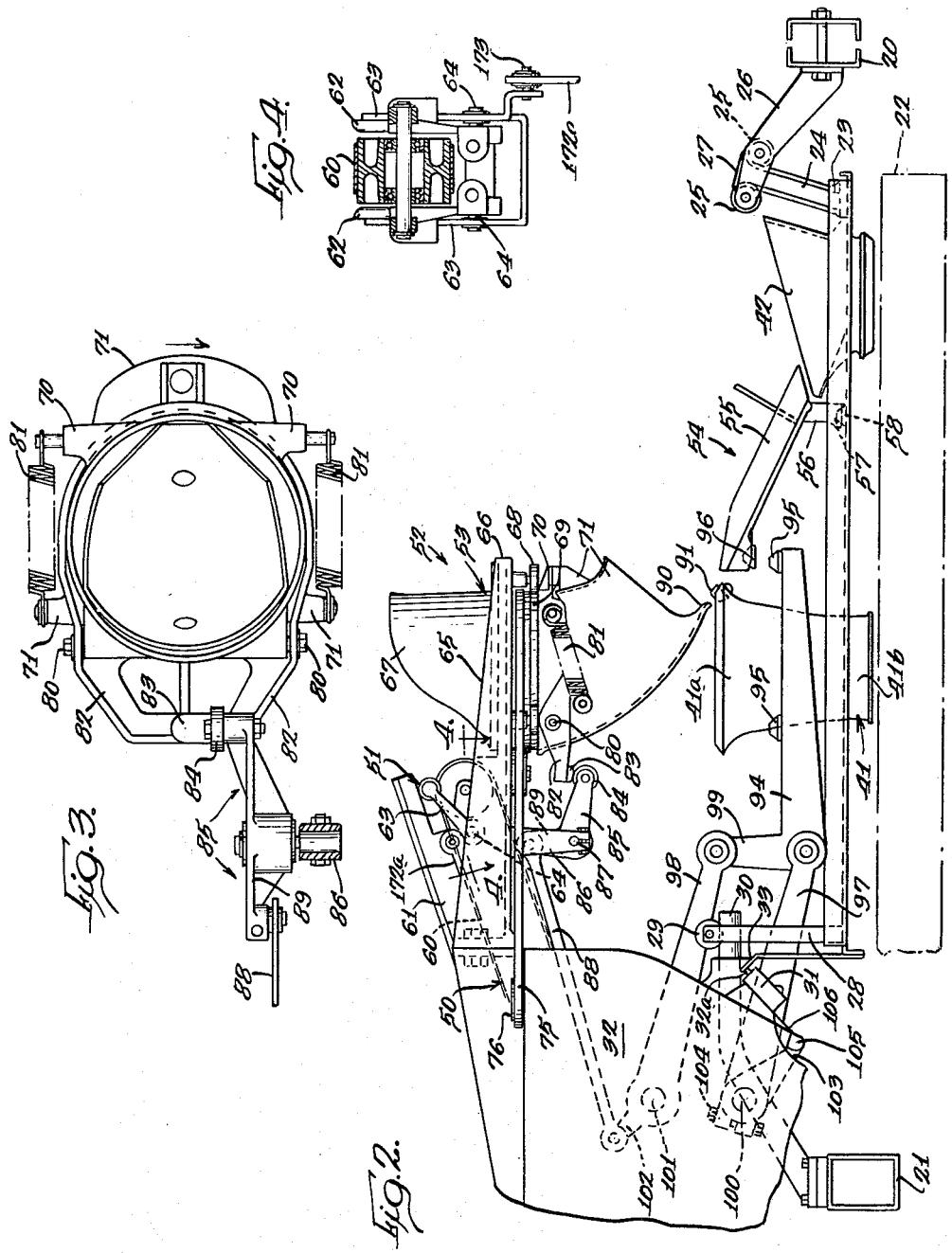

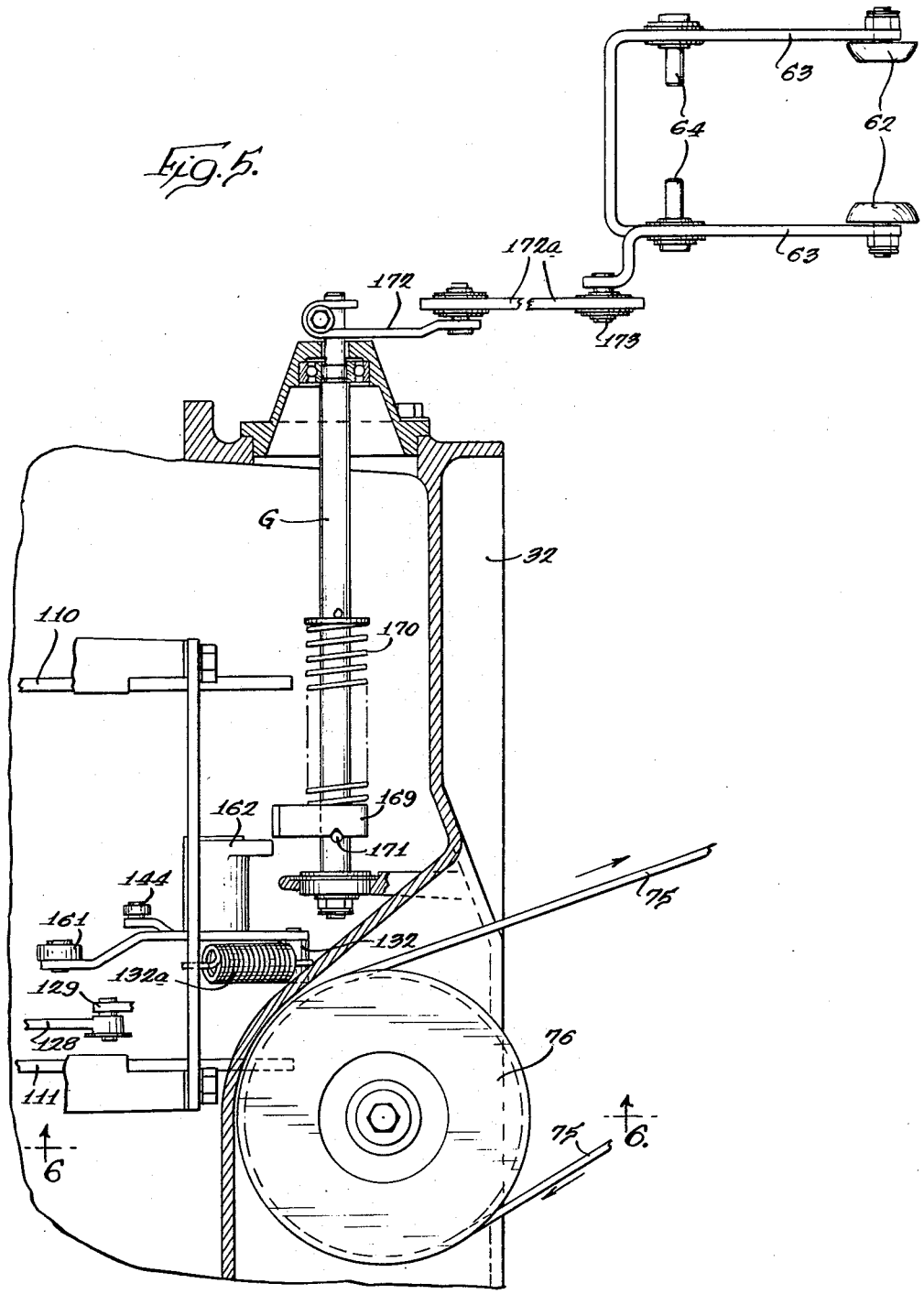

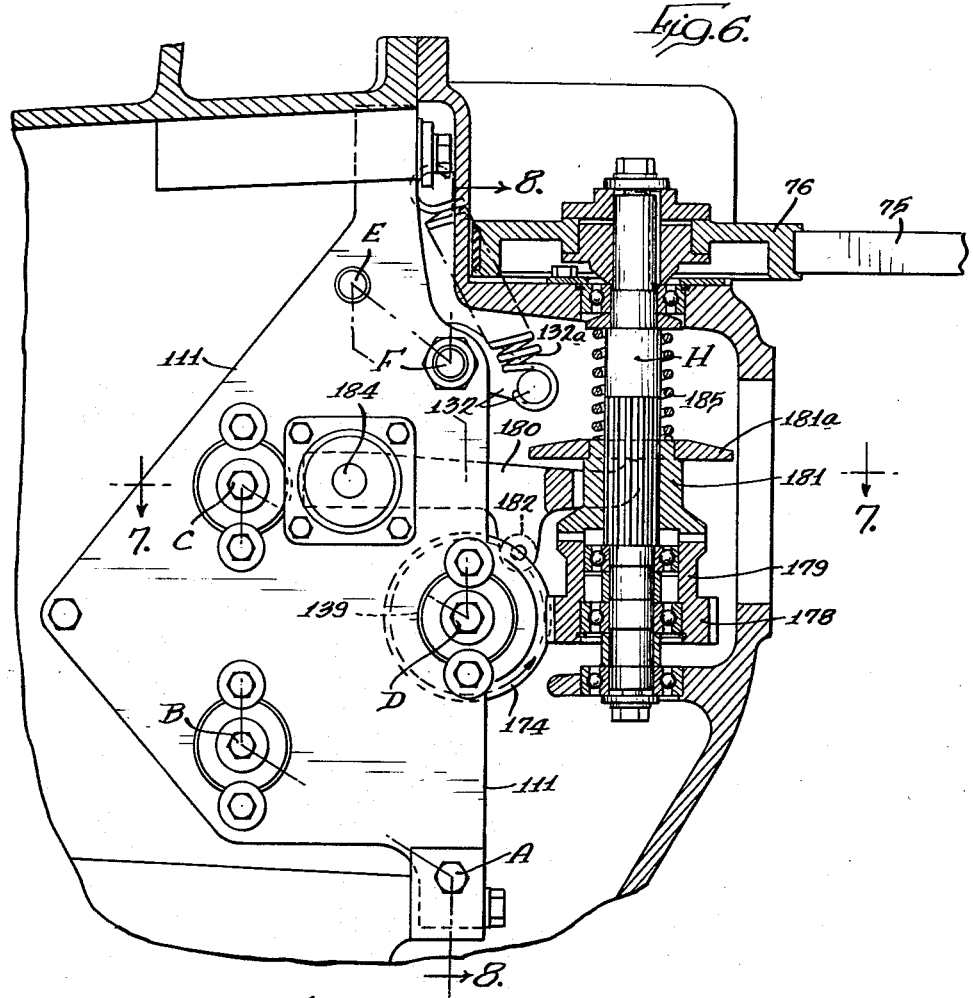
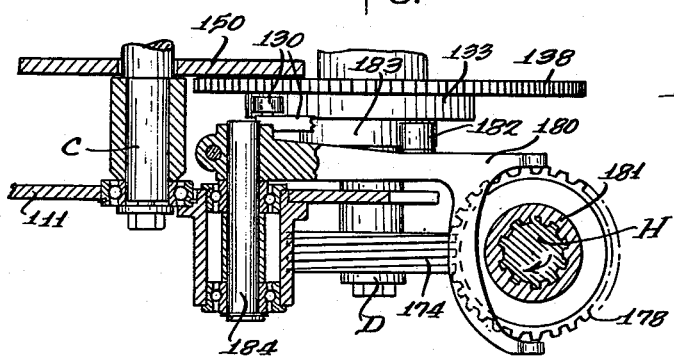

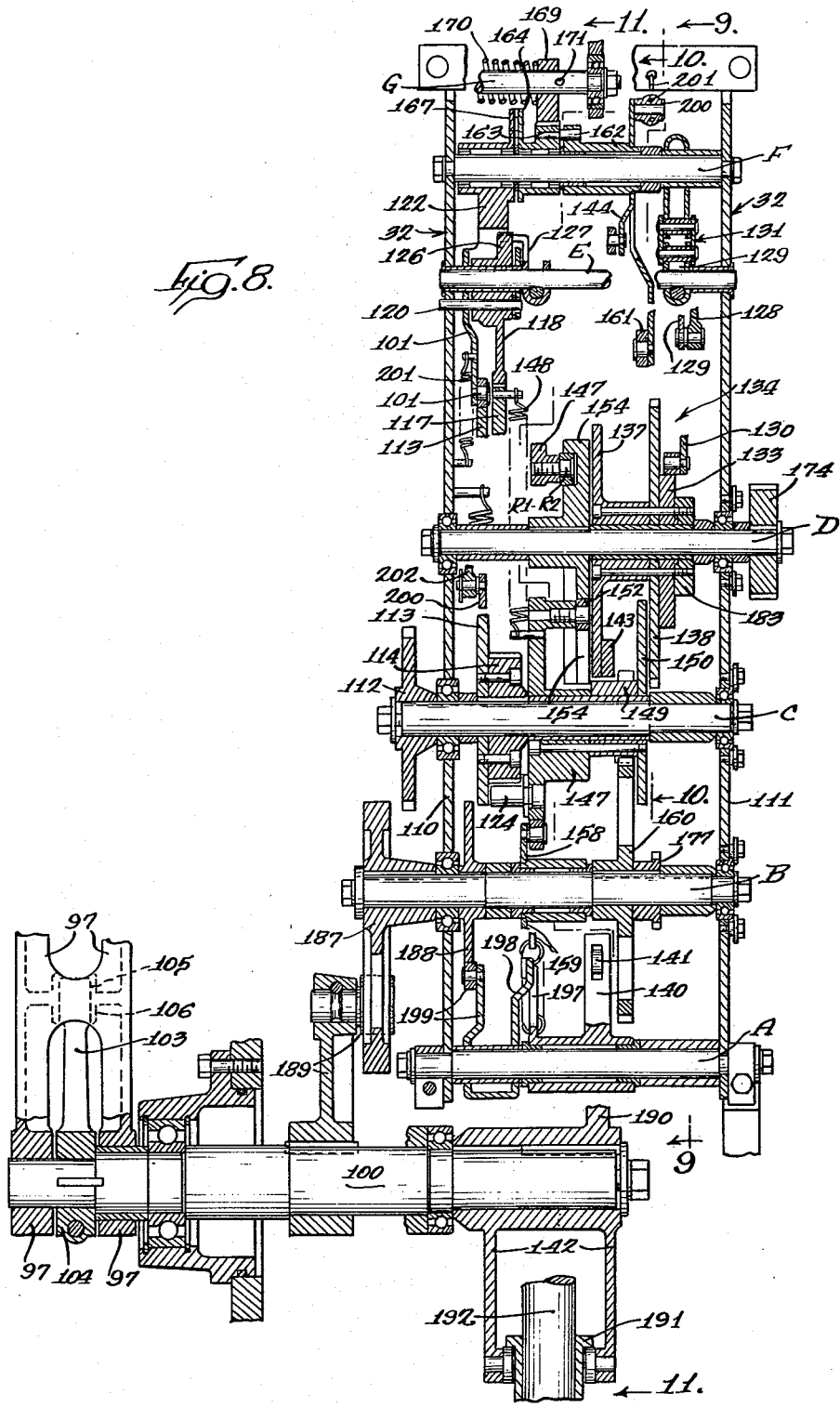

3,499,648
DISTRIBUTING MECHANISM WITH SELECTIVELY
OPERATED PIN GATE
William F. Huck, Forest Hills, and James B. Wyatt,
Brooklyn, N.Y., Alexander J. Albrecht, Franklin Lakes,
N.J., and Michael G. Gautraud, Muskegon, Mich., assignors to Brunswick Corporation, a corporation of
Delaware
Original application Aug. 7, 1964, Ser. No. 388,051, now
Patent No. 3,409,296, dated Nov. 5, 1968. Divided
and this application Nov. 13, 1967, Ser. No. 719,801
Int. Cl. A63d 5/08
U.S. Cl. 273—43
5 Claims

ABSTRACT OF THE DISCLOSURE

A bowling pin handling apparatus having pin distributor mechanism and a pin conveyor leading to the pin distributor with a three-position pin gate controlling passage of pins from the conveyor to the distributor and an actuating mechanism including a clutch for causing operation of said components.

This is a division of application Ser. No. 388,051, filed Aug. 7, 1964, and now Patent No. 3,409,296.

This invention relates to bowling pin handling mechanism, and more particularly to pin distributing mechanism for an automatic pinsetter, and to components thereof.

The primary object of this invention is to provide a new and improved pin handling mechanism.

Another object is to provide a new and improved pin distributing mechanism in an automatic pinsetter.

A still further object is the provision of a new and improved actuating mechanism for a pin distributor chute.

Another object is provision of a new and improved mechanism for controlling passage of pins from a conveyor to a pin distributor. A related object is provision in such a mechanism of a pin gate operable from a pin sensing to a pin blocking position responsive to a bowling pin engaging the gate, and when in pin blocking position actuating the mechanism for movement of the gate to pin passing position.

A still further object is provision of a new and improved pin distributor mechanism wherein indexing of a distributor chute occurs prior to a pin drop.

A further object is provision of new and improved actuating mechanism for indexing a pin distributor chute, controlling operation of a pin gate which permits passage of bowling pins to the distributor chute, operating a guide which holds the pins so as to move the pins into operative distributing position in a deck structure and to operate a portion of the distributor chute for passing pins to the guide.

Other objects and advantages of the invention will become readily apparent from the following detailed description taken in connection with the accompanying drawings, in which:

FIGURE 1 is a fragmentary plan view of a pin distributor mechanism in an automatic pinsetter;

FIGURE 2 is a fragmentary side view of a portion of the mechanism shown in FIGURE 1, with parts removed for clearer illustration;

FIGURE 3 is a fragmentary, enlarged plan view of a portion of FIGURE 2;

FIGURE 4 is a fragmentary sectional view taken generally along the line 4—4 in FIGURE 2;

FIGURE 5 is a fragmentary horizontal sectional view of a portion of the mechanism, with parts broken away for clearer illustration;

FIGURE 6 is a sectional view taken generally along the line 6—6 in FIGURE 5;

FIGURE 7 is a sectional view taken generally along the line 7—7 in FIGURE 6;

FIGURE 8 is a sectional view taken generally along the line 8—8 in FIGURE 6;

Figure 9:
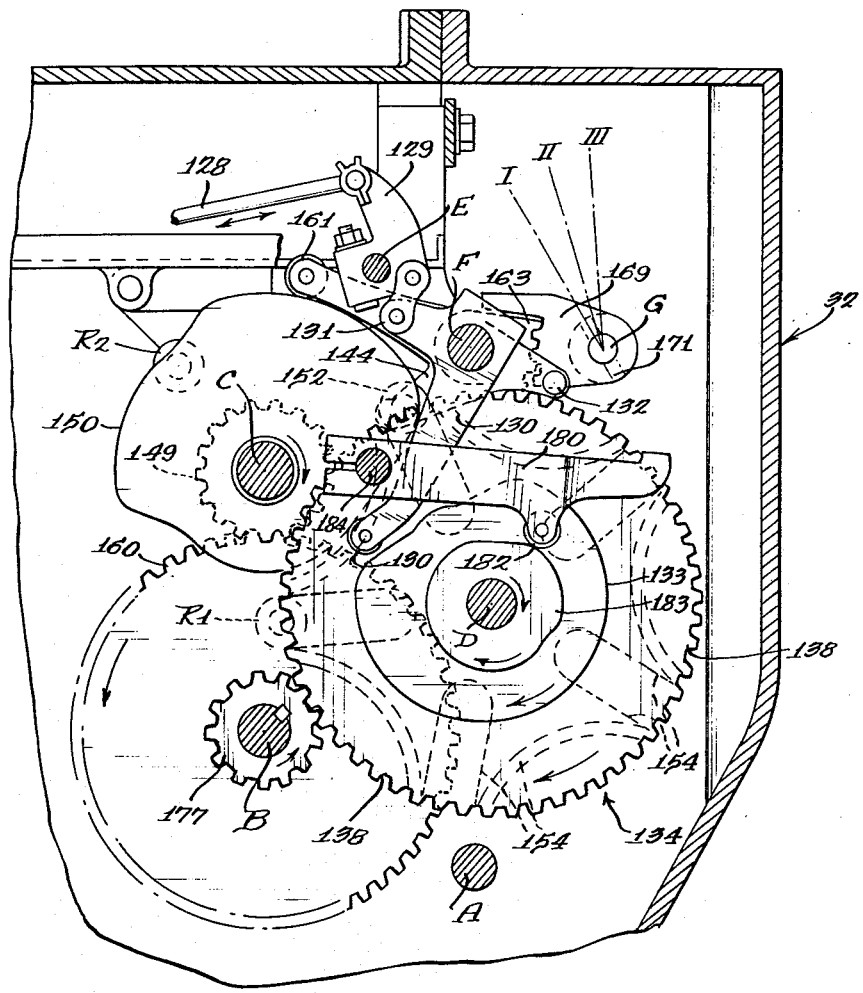
FIGURE 9 is a sectional view taken generally along the line 9—9 in FIGURE 8.

While an illustrative embodiment of the invention is shown in the drawings and will be described in detail herein, the invention is susceptible to embodiment in many different forms, and it should be understood that the present disclosure is to be considered as an exemplification of the principles of the invention and is not intended to limit the invention to the embodiment illustrated. The scope of the invention will be pointed out in the appended claims.

AUTOMATIC PINSETTER STRUCTURE AND OPERATION THEREOF

Referring to FIGURES 1 and 2 of the drawings, an automatic pinsetter generally of the type disclosed in United States Patent to Albrecht et al. No. 3,014,721, includes means for operatively installing the pinsetter above the pit end of a bowling alley lane, and herein this means is in the form of a frame including a front frame cross member 20 and a rear frame cross member 21. A lower movable deck structure 22 is shown in phantom lines in FIGURE 2, and is suitably mounted in a generally horizontal plane for movement vertically toward and away from an operatively stationary deck 23 to position and handle bowling pins on the lane below the decks.

In order to protect the pinsetter against damage in the event of a pin jam, as by a bowling pin being held between movable deck 22 and stationary deck 23, the operatively stationary deck is mounted for limited control movement. Herein the decks are of known triangular configuration and a front apex of deck 23 is provided with an upwardly and forwardly inclined front arm 24 received between spaced apart rollers 25 secured to front frame cross member 20 by bracket means 26, thus mounting deck 23 for limited upward and forward movement. An outwardly flared upper portion 27 of arm 24 is normally seated on rollers 25 suspending the front end of deck 23 in normal operatively stationary position. Each rear apex of deck 23 is provided with an assembly defining upright arm means 28, each with an upper end carrying a roller 29 seated on a generally horizontal track 30 fixedly mounted on and extending forwardly from rear frame cross member 21, so that the rear portion of the deck may move a limited amount in the event of a pin jam.

Means for stopping operation of the pinsetter in the event of such a pin jam is provided in the form of an electric switch 31 fixedly mounted with respect to the frame and more particularly secured to a portion of a gear box housing 32 for a control gear system. Switch 31 is normally maintained closed by an actuator 32a to render the pinsetter operative, and herein a finger 33 is fixedly secured to and extends upwardly from the rear edge of operatively stationary deck 23 so that in the event of a pin jam between decks 22 and 23 and as the rear portion of deck 23 moves upwardly or forwardly finger 33 will move away from the switch actuator to open the switch and stop operation of the pinsetter.

Pin openings 40 are provided in stationary deck 23 in a conventional pattern corresponding to pin positions 1 through 10 on the lane, and each of these openings is similarly designated as 40–1 through 40–10, as shown in FIGURE 1, and including a central opening 40–5 about which the remaining openings extend in a continuous series beginning with opening 40–1 at the front apex and, as viewed from the top, continuing clockwise about central opening 40–5 as follows: 40–2, 40–4, 40–7, 40–8, 40–9, 40–10, 40–6 and 40–3.

Each of these openings is provided with a pin receiving bucket, open at its top and bottom, for receiving and passing pins to lower deck 22. In the illustrated embodiment, central opening 40–5 is provided with a long tapered cylindrical bucket 41 including an upper piece 41a and a lower piece 41b. Apex buckets 42 are similar to each other in confiuguration and are provided in openings 40–1, 40–7 and 40–10 adjacent each of the deck apexes. Similar buckets 43 are provided in openings 40–2, 40–4, 40–8, 40–9, 40–6 and 40–3. Buckets 42 and 43 are shaped so that each bucket may hold a bowling pin in inclined position with the base of the respective pin abutting an inner surface portion of the bucket most remote from central opening 40–5. These buckets are preferably composed of a rubber compound having good vibration dampening and sound absorbing properties, coupled with a relatively low coefficient of surface friction to facilitate pins sliding thereon, and are pressed into their respective pin openings.

Pin handling mechanism is provided and includes an upwardly and forwardly inclined belt type conveyor 50 which receives bowling pins from other suitable apparatus (not shown) and conveys the pins in series base forward to a pin gate 51 for controlling passage of the pins to a distributor mechanism 52 having a chute mechanism 53 which distributes bowling pins one at a time to a guide mechanism 54 having nine guide cradles 55, one associated with and aligned with each of the buckets 42 and 43. Guide mechanism 54 holds the pins in operative position with their bases abutting the respective buckets, as previously described, and is operable for tilting the pins into the buckets. Guide member 54 is in the form of a guide ring unit generally concentric about central opening 40–5. Unit 54 has a plurality of depending legs 56, each with a generally frusto-conical socket 57 freely receiving a frusto-conical bumper 58 fixedly mounted on stationary deck 23 so that the guide unit is maintained properly oriented in normal position and may be raised for tilting the pins into the buckets for passage through deck openings 40. Chute 53 cooperates with center opening bucket 41 for holding and then releasing a pin for passage through center opening 40–5, and this operation is synchronized with that of guide mechanism 54.

Suitable means (not shown) deposit bowling pins in a series on belt 60 of conveyor mechanism 50 with the base end of the pins leading, in which position the pins are carried upwardly in a series between opposite upwardly and outwardly inclined side retaining walls 61. As a pin base engages pin gate 51, and more particularly pin stops or opposed rollers 62, one on each leg of a U-shaped pin gate bracket 63, the pin gate is pivoted about a pin 64 which mounts the pin gate on a frame portion of conveyor mechanism 50, so that pin gate 51 moves from a normal sensing position, as indicated in FIGURE 2 and by solid lines in FIGURE 10, to a pin blocking position and indicated by dotted lines in FIGURE 10. When pins are to be distributed to openings 40 in deck 23 a suitable signal is fed to a control gear system, contained primarily in gear box 32, and with pin gate 51 in pin blocking position another signal is sent to the gear system indicating that a pin is available for passage to distributing mechanism 52 whereupon the gear system moves pin gate 51 from pin blocking position to a pin passing position, as indicated by phantom lines in FIGURE 10, whereupon conveyor belt 60 carries a pin pass pin gate 51 and deposits its base end leading into chute 53. Pin gate 51 then returns to pin sensing position shown in FIGURE 2.

Pin distributor mechanism 52 is mounted on a cantilever beam 65 having a rear end firmly secured to the pinsetter frame, and more particularly to a vertical wall of housing 32, and a front end in the form of a ring 66 mounting an upper stationary portion 67 of chute 53, and having a plurality of depending rollers 68 mounted for rotation about vertical axes and received in a groove 69 of an intermediate portion 70 of the chute for rotation thereof about a vertical axis passing through the center of the ring and of deck opening 40–5 so that a lower chute portion 71 may be rotated into alignment with guide cradles 55. Chute 53 is normally aligned with guide cradle 55 associated with stationary deck opening 40–5 at the front apex of the deck. Step-by-step movement of chute 53 in a clockwise direction as viewed in FIGURE 1 for successive alignment with openings 40–2, 40–4, 40–7, etc., and back to opening 40–1, is provided by a belt drive including a belt 75 extending about a pulley formed integrally with intermediate chute portion 70 and a pulley 76 on gear box housing 32 and driven by the control gear system, as will be described hereinafter. Each pin thus associated with a peripheral deck opening rests on its respective guide cradle 55 with its base end abutting the respective bucket, 42 or 43, as previously described.

In order to hold a pin positioned for deposit in opening 40–5, lower chute portion 71 is mounted for pivotal movement about a horizontal axis, and herein a pair of opposed pins 80 pivotally mounts the upper rear end of lower chute portion 71 on intermediate chute portion 70. A pair of spiral tension springs 81, one on either side of the chute, interconnects the lower chute portion and the intermediate chute portion for maintaining the lower chute portion in normal elevated position as illustrated in FIGURE 2. An arm 82 having an abutment plate 83 is fixedly secured to the upper rear portion of chute 71 and cooperates with an abutment in the form of a roller 84 on the outer end of a lower arm of a bell crank 85 mounted by means of a pin 87 on a depending finger 86 of cantilever beam 65 for pivotal movement about a horizontal axis responsive to operation of a link 88 pivotally connected to the upward extension 89 of bell crank 85. Link 88 is controlled responsive to operation of the gear system to pivot the bell crank counterclockwise, thereby moving a lower inclined lip 90 of lower chute portion 71 clockwise, as viewed in FIGURE 2, so that a pin passing through the chute engages a bumper or stop 91 of the forward portion of an upper lip of bucket 41.

Means for operating lower chute portion 71 and guide 54 to release the pins from holding position abutting their respective buckets is provided in the illustrated embodiment by a linkage controlled by the gear system.

A plurality of guides 55 is provided on the ring unit. Ring guides 55 may be elevated by means of an elevating ring 94 generally concentric about bucket 41 and having a plurality of radially spaced frusto-conical bumpers 95 which are received in downwardly opening frusto-conical sockets 96 in the guide, thus maintaining the guide properly aligned with buckets 42 and 43 as it is lifted off of bumpers 58.

Elevating ring 94 is maintained in a horizontal position throughout its operation by means of an elevating linkage including a pair of generally parallel links 97 and 98 pivotally connected at front ends to a connecting link 99 extending upwardly from and forward integrally with elevating ring 94, and pivotally mounted at their rear ends on the frame, and more particularly on gear box housing 32. Link 97 is freely pivotable on a horizontal shaft 100 of the gear system and link 98 is freely pivotal on a stub shaft 101 extending outwardly from gear box housing 32. A finger 102 is formed integrally with upper link 98 and is pivotally connected with a rear end of connecting link 88 which actuates bell crank 85. A driver 103 is fixedly secured to shaft 100 as by a split collar 104, for rotation with this shaft, and responsive to counterclockwise rotation of this shaft an abutment 105 on an end of driver 103 abuts an abutment 106 of the lower side of lower link 97 thereby raising this link which causes elevator ring 94 to raise. Upper link 98 raises along with lower link 97 and during such movement finger 102 rotates counterclockwise to move connecting link 88 rearwardly thus moving bell crank roller 84 upwardly against plate 83 on lower chute portion 71, causing the lower chute portion to pivot clockwise. Rotation of shaft 100 is controlled in such a manner that lower chute portion 71 pivots a small amount and lip 90 is moved inward of pin holding bumper or abutment 91. As a pin passes base first through the chute it therefore seats against abutment 91 and is held in position for later passage through bucket 41 to lower deck 22. During this first stage of operation, elevator ring 94 moves up slightly, but a lost motion gap between bumpers 95 and sockets 96 in normal position permits lower chute portion 71 to pivot to its intermediate holding postion without raising guide 55. Subsequently, the control gear system causes shaft 100 to rotate counterclockwise an additional amount sufficient to raise guides 55 and pivot lower chute portion 71 clockwise so that all ten pins being held against buckets 41–43 are dropped through stationary deck openings 40 to the lower movable deck 22. Thereafter, shaft 100 is rotated clockwise by the control gear system to its normal position and springs 81 return lower chute portion 71 to its normal position and guides 55 are again seated on bumpers 58.

Means for (1) operating pin gate 51, (2) indexing chute 53 step-by-step about a vertical axis for depositing bowling pins in holding position on guides 55 and respective buckets 42 or 43, (3) pivoting lower chute portion 71 downwardly from normal position to intermediate holding position with a pin resting on lower chute portion 71 and bumper 91 on center bucket 41, and (4) pivoting lower chute portion 71 downwardly an additional amount from intermediate holding position to pin releasing position, while elevating guides 55 for tipping pins held by the guides and buckets 42 or 43 into a generally vertical position for passage through the buckets to lower movable deck 22; is provided in the illustrated embodiment by the linkage previously described in cooperation with the previously referred to gear system contained in housing 32 and best shown in FIGURES 5–11.

CONTROL GEAR SYSTEM

Turning to FIGURES 5 through 11, the control gear mechanism includes the distributor indexing mechanism, a large portion of which is mounted between side frames 110 and 111 of gear box 32. Side frames 110 and 111 are bolted as a unit to the front side of the main gear box 32 and are cased in by the gear box front cover which also may serve as a support for the funnel chute 53 as previously described.

Shafts A and F are stationary shafts which serve as cross ties and spacers between side frames 110 and 111. Shafts B, C, D and E are rotatably mounted and axially constrained in side frames 110 and 111. Shafts G and H are rotatably mounted and axially constrained in the gear box front cover.

Power input for gear system

The gear system is driven by chain sprocket 112 mounted on shaft C for rotation therewith (FIGURE 8). Thus, shaft C is the main power input shaft of the system and, in turn, drives various elements of the gear assembly. Shaft C is continuously driven clockwise as viewed in FIGURE 9 at constant speed by the chain sprocket, e.g. at about one revolution per second. Chain sprocket 112, pulse cam 113 and ratchet wheel 114 are each keyed and axially constrained on shaft C.

Pulse cam 113 and ratchet wheel 114 are bolted together (FIGURE 8) in such a way that a center line through the peak of each of the equally spaced rises on pulse cam 113 slightly trails a center line through one of the equally spaced slots in ratchet wheel 114, in the direction of rotation, in order that the latching end of a pawl 117 (pivotally mounted on a pin 124) will contact the outer surface of wheel 114 when released by pawl stop 118 (freely rotating and axially constrained on shaft E).

In the form of pulse cam 113 illustrated (FIGURE 10), six rises are included. Pulse cam 113 provides the power source for pulse cam follower 119 which pivots around pin 120, fastened to ratchet pawl stop 118. Follower 119 includes a roller which rides on pulse cam 113 and is spring-loaded to frame 110 in a counterclockwise rotation to insure contact with pulse cam 113. Integral with the roller of follower 119 is finger 121. When finger 121 does not contact anvil 122, follower 119 is free to rotate about pivot pin 120, which connects the pulse cam follower 119 with ratchet pawl stop 118. Pin 120 is fastened to pawl stop 118 and extends over the side of frame 110, using frame 110 as a downward limit stop for pawl stop 118.

Figure 11:
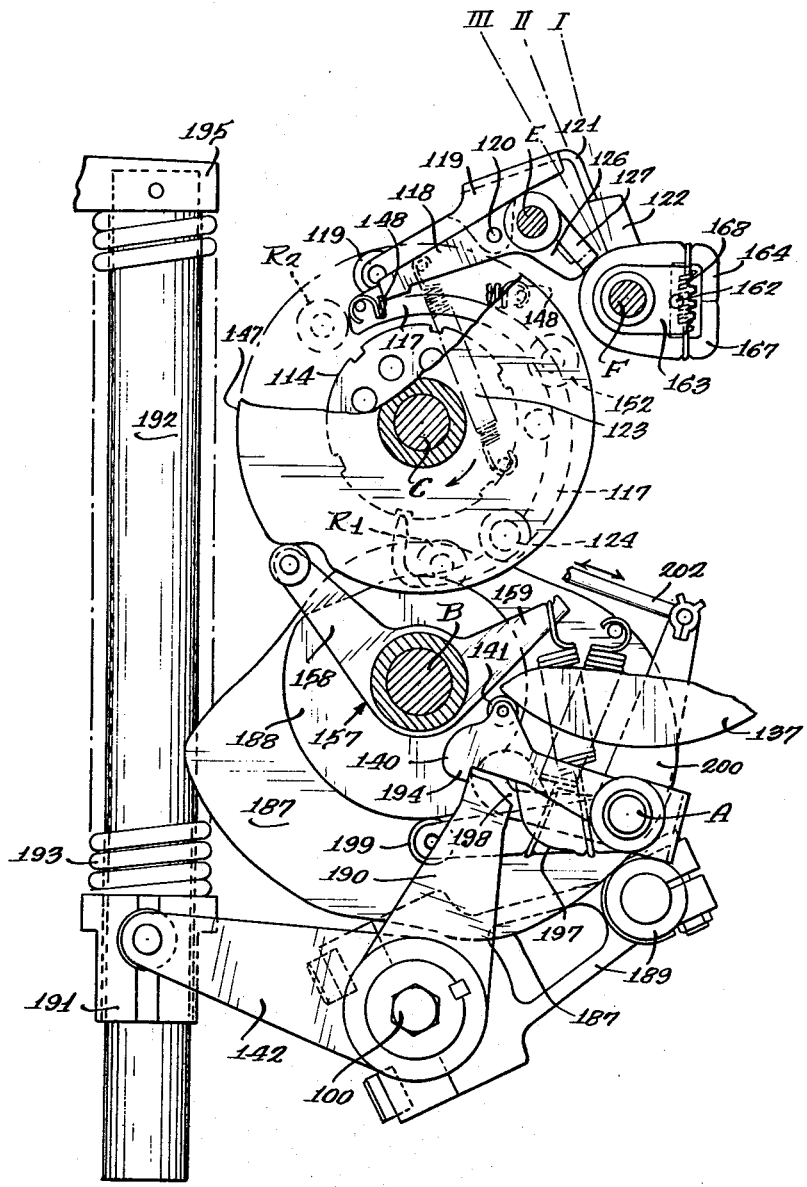
FIGURE 11 is a sectional view taken generally along the line 11—11 of FIGURE 8.

Ratchet pawl stop 118 is freely rotatable on shaft E and spring-loaded counterclockwise as viewed in FIGURE 11 about shaft E by spring 123 on pulse cam follower 119 and pivot pin 120. Pawl stop 118 normally latches to pawl 117, preventing pawl 117 from pivoting about pin 124 and engaging in ratchet wheel 114. A contact arm portion 126 is provided as an extension of ratchet pawl stop 118 and contacts the trip arm 127 which, upon a release signal by the signal rod 128 (which connects with the pin detector mechanism) moves ratchet pawl 117 upward, releasing pawl 117.

Shaft E rotates intermittently through a small angle in response to a signal from the signal rod 128 through arm 129 or the cam follower 130 through link 131. Keyed and axially constrained to shaft E are lever 129 and trip arm 127. The signal rod 128 connects a detector mechanism with arm 129, which in turn is keyed to shaft E connecting signal rod 128 with link 131. The detector mechanism signals when the moving deck is ready to receive pins by moving rod 128 to the right as viewed in FIGURE 9 to signal that the moving deck structure is up and ready to receive pins. For example, a detector apparatus comparable to that used in conventional pinsetter installations to signal that a moving deck is up and ready to receive pins in such installations may be used herein. A spring 132a acting between a brace interconnecting side frames 110 and 111 and spring arm 132 provides a clockwise rotational force to shaft E. Cam follower 130 is integrally constructed with an arm which is in turn connected to link 131. Follower 130 is adapted to contact the cam 133 and to be maintained on, or to be removed from cam 133 by the interaction of link 131 and arm 129.

Cam 133 is a part of a gear and cam cluster 134 free to rotate as a unit on shaft D. The cluster 134 consists of a latch cam 137, a gear 138, cam 133, and clutch shifter cam 183, which are bolted together as a unit.

A distributor latch 140, adapted to freely rotate on shaft A, is provided with a cam follower 141 which rides on cam 137 of cluster 134 and controls the latching and unlatching of an arm 190 of a distributor lift spring arm 142. The latch cam 137 has attached along a portion, e.g. approximately ⅙ of its periphery, a pin gate lockout sector 143 which, in conjunction with a pin gate lockout follower 144, is capable of locking pin gate 51 into Position #I. Cam 137 has a low dwell for a portion, e.g. approximately ¼ of its periphery, and a high dwell for the remainder of its periphery.

Ratchet pawl 117 is pivotally mounted on pin 124 which is in turn bolted to Geneva driver 147. Pawl 117 is normally disengaged from ratchet wheel 114 and latched to ratchet pawl stop 118. The outer surface of pawl 117 is so shaped that pawl stop 118 can smoothly engage and depress the spring-loaded latching end of pawl 117 into the position shown in FIGURE 11. The end of pawl 117 which latches to stop 118 is spring-loaded in a clockwise direction about pin 124 by spring 148. The opposite end of spring 148 is anchored to a pin on driver 147.

Ratchet pawl 117, when released by ratchet pawl stop 118, engages ratchet wheel 114 enabling Geneva driver 147 to rotate with shaft C. The end of pawl 117, which latches to wheel 114 is curved in the illustrated form to permit deflection of pawl 117 at the moment of engagement with wheel 114 to protect against heavy shock loads which may result from almost instantaneous acceleration of the masses attached to pawl 117. Because of such heavy shock loads, pawl 117 is fabricated of resilient material, preferably of high impact strength, such as high quality spring steel.

Ratchet wheel 114, keyed to shaft C and bolted to pulse cam 113, rotates clockwise as viewed in FIGURE 11 with shaft C. The equally spaced slots in wheel 114 are a multiple of, e.g. 1 to 4 times, the number of rises in cam 113 and have a predetermined relationship with the rises in pawl cam 113. In the form shown there are six slots in wheel 114 and there are six rises in cam 113. Wheel 114, in conjunction with ratchet pawl 117, provides a positive clockwise, intermittent drive between the power input shaft C and the indexing cycle output to the distributor funnel assembly which is taken off at shaft H.

Geneva driver 147 freely rotates on shaft C and is rigidly bolted to pinion 149 and pin gate cam 150 which also rotate freely on shaft C. Driver 147, pinion 149 and cam 150 are all axially constrained on shaft C. On the side of Geneva driver 147 facing frame 110 are provided the ratchet pawl pivot pin 124, a pawl stop and a stud serving as anchor for the ratchet pawl spring 148. On the opposite side of driver 147, facing frame 111, cam roller 152 functions as the driver for Geneva wheel 154, and two other rollers $R_1$ and $R_2$ are provided as Geneva wheel stop guides. The circumference of the Geneva driver 147 is a cam surface with pawl accelerator 157 riding on the cam surface. Pawl accelerator 157 is freely rotatable on shaft B and includes two arms, one of which is follower 158 which rides on the outer cam surface of Geneva driver 147 and the other of which is arm 159 which carries a spring for urging cam follower 158 onto Geneva driver 147. The cam surface of Geneva driver 147 is shaped so that it will provide additional motion to driver 147 when the ratchet pawl 117 is being disengaged from ratchet wheel 114.

Pinion 149 meshes with gear 160, thereby providing a speed reduction, e.g. 3 to 1, from driver 147 to shaft B. This speed reduction is part of a greater speed reduction, e.g. 12 to 1, in a gear train reduction from the power input to shaft D.

Gear system for control of pin gate

Referring still to FIGURES 5 through 11, starting with shaft F, pin gate cam follower 161 is provided, integrally constructed, with gear sector fork 162, pin gate lockout arm and spring arm 132. Fork 162 constrains the anvil gear sector 163 within the range provided by the positioning of fork 162 on shaft F. Pin gate lockout arm 144 carries a follower roller which rides on pin gate lockout sector 143 (mounted on distributor latch cam 137) maintaining pin gate cam follower 161 away from pin gate cam 150, thereby holding pin gate 144 in its uppermost or pin sensing position. Spring arm 132 is an integral part of pin gate cam follower 161 and supports the spring which forces cam follower 161 in a counterclockwise rotation about shaft F, holding cam follower 161 on cam 150 or pin gate lockout arm follower on sector 143.

Figure 10:
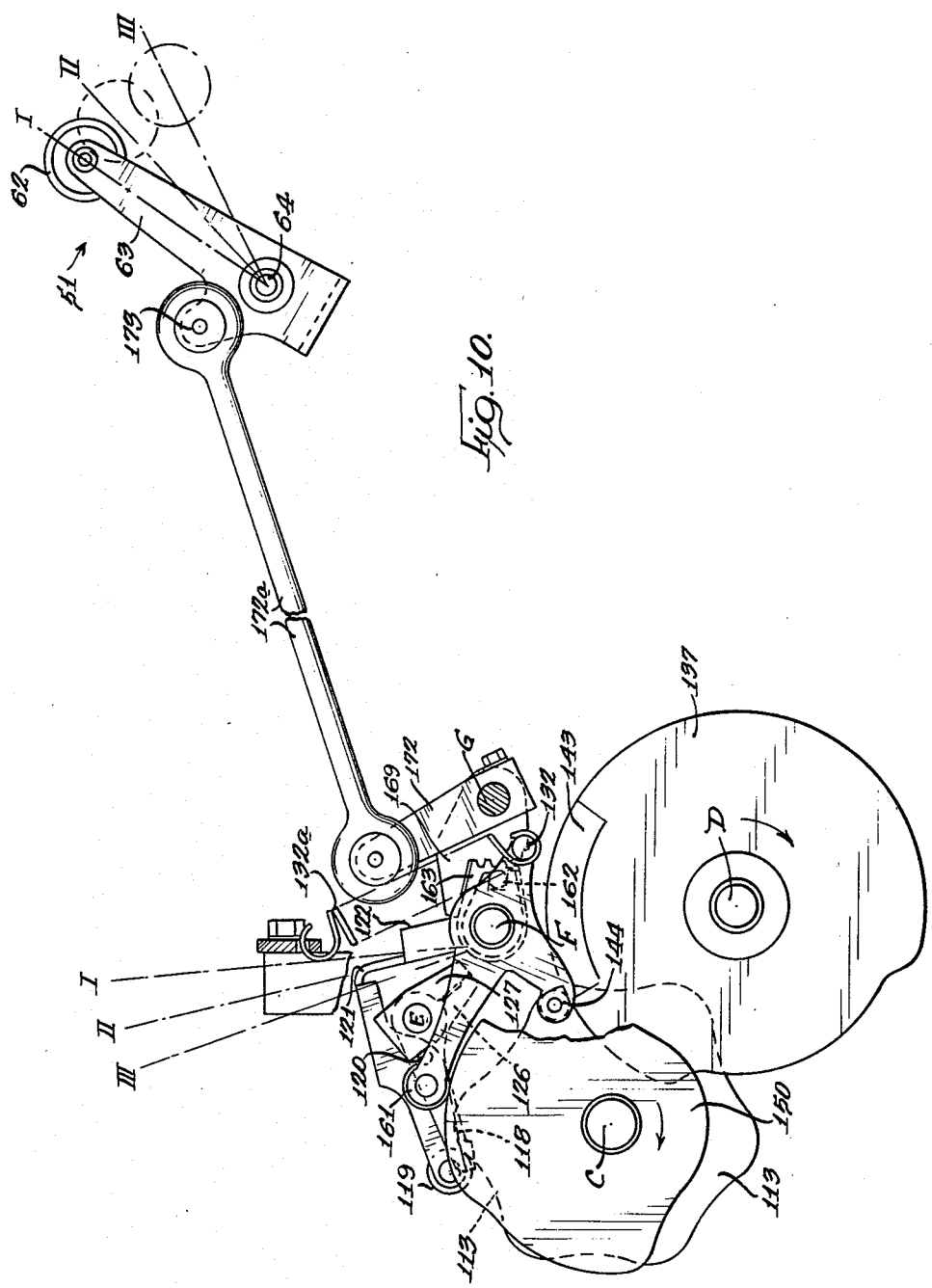
FIGURE 10 is a sectional view taken generally along the line 10—10 in FIGURE 8.

Pin gate lockout sector 143 is adapted to lock pin gate 51 in the pin sensing position by maintaining pin gate cam follower 161 in an uppermost position (FIGURE 10). Distributor latch cam 137 is free to rotate, as a part of gear and cam cluster 134, on shaft D. Pin gate cam 150 on which cam follower 161 is adapted to ride is bolted to and freely rotatable at one revolution per cycle with Geneva driver 147 and pinion 149 on shaft C. The circumference of pin gate cam 150 has three levels to provide pin gate 144 with its three positions, i.e. the uppermost pin sensing position (solid dark lines of FIGURE 10), the intermediate pin blocking position (dotted lines of FIGURE 10) and the lowermost pin passing position (phantom lines of FIGURE 10).

Anvil gear sector 163, freely rotatable about shaft F and constrained by fork 162 and having its range of movement determined by the relative position of fork 162, in turn determines the movement of anvil 122. Integrally constructed with anvil gear sector 163 is spring arm 164 which is urged into contact with opposing trigger arm 167 by trigger spring 168 in a clockwise direction about shaft F as viewed in FIGURE 11. The surfaces beyond both sides of the gear teeth of anvil gear sector 163 are raised to provide a limited angular motion of gear sector 163 prior to interference with the raised surfaces of gear sector 169 (FIGURES 8 and 9). Trigger anvil 122 is freely rotatable on shaft F and determines the position of the pulse cam follower finger 121 and is integrally constructed with trigger arm 167. Arm 167 is held in contact with trigger spring arm 164 by trigger spring 168.

Pin gate gear sector 169 is rotatably mounted and free to slide axially on shaft G. Spring 170 loads pin gate gear sector 169 axially against shaft pin 171 and into a V-groove on the gear hub of gear sector 169, thereby adapted for safety purposes. Gear sector 169 will override pin 171 against the pressure of spring 170 when external load, i.e. a load other than that of a bowling pin, from pin gate 51 becomes unexpectedly excessive, to disengage gear sector 169 from rotational motion with shaft G and prevent damage to the mechanism. The anvil gear sector 163 meshes with and drives the gear sector 169 which rotates shaft G by contact with pin 171. Pin gate gear sector 169 is linked to pin gate 51 by tie-rod 172a and pivot arm 172. Pivot 173 is provided as the pivot joint between tie-rod 172a and pin gate 52, transmitting angular pin gate motion to shaft G.

Pin gate 51 is freely rotatable about pin 64 which provides the pivot axis for pin gate 51. The pin gate, including two pin stops 62, is axially constrained on pin 64 with its two arms or pin stops straddling the cross conveyor belt 60 (see FIGURE 4).

Gear system for control of funnel indexing

Shaft H is the funnel chute indexing output shaft and keyed to shaft H is timing belt drive pulley 76 which transmits indexing rotation from shaft H by means of timing belt 75 to the distributor chute 53. Rotation of pulley 76 is clockwise as viewed in FIGURE 5.

Shaft D is intermittently driven in a counterclockwise direction by means of Geneva driver 147 and Geneva wheel 154 as viewed in FIGURES 9 and 11, resulting in a speed reduction, e.g. 5 to 1 speed reduction, from driver 147 to shaft D. The Geneva wheel 154 and a helical gear 174 are keyed to and axially constrained on shaft D. Geneva wheel 154 illustrated as having five stations, is driven by Geneva cam roller 152. Although five stations are illustrated, of course, any number of stations may be utilized, e.g. by changing the ratios of gears 174 and 178 and pulley 76. The rollers $R_1$ and $R_2$ function as stop guides for wheel 154 by engaging the inner extensions of Geneva wheel 154. Intermittent clockwise rotation is imparted to the gear and cam cluster 134 freely rotating on shaft D from shaft B by pinion 177 through gear 138 of the cluster, resulting in speed reduction from shaft B to the gear and cam cluster 134.

Helical gear 174 is meshed with helical gear 178, freely rotating and axially constrained on shaft H (FIGURES 6 and 7). Gears 174 and 178, in the illustrated embodiment, in combination result in a 1 to 1 speed ratio from shaft D to shaft H. Helical gear 178 is integrally constructed with lower clutch member 179 and gear 178 transmits rotational motion from shaft B to shaft H when lower clutch member 179 is engaged by upper clutch member 181. Upper clutch member 181 is splined to rotate with and slide on shaft H and is operated by shifter arm 180 urging against clutch shifter ring or flange 181a secured to upper clutch member 181 for disengaging clutch member 181 from clutch member 179. Spring 185 urges clutch member 181 normally into engagement with clutch member 179.

The engaging teeth of clutch members 179 and 181 are configurated or beveled to provide an overload safety feature. If an excessive rotational torque is applied from outside the indexing mechanism to shaft H, the force applied to the bevel on the teeth of clutch members 179 and 181 enables clutch member 181 to override clutch member 179, opposing the force due to spring 185, and, therefore, shaft D will not rotate with shaft H so that damage to the mechanism may be prevented which may otherwise occur as a result of overloading.

Shifter arm 180 is keyed to shaft 184 which is mounted and axially constrained by bearings through casing wall 111. Shifter arm 180 carries follower roller 182 which is adapted to ride on cam 183 causing clutch shifter arm 180 to move clutch member 181 out of engagement with clutch member 179 by pivoting arm 180 counterclockwise about shaft 184. When permitted to pivot clockwise by follower roller 182 riding on cam 183, shifter arm 180 permits spring 185 to urge clutch member 181 into engagement with clutch member 179. Spring means, not shown, may be provided to assure positive contact between follower 182 and cam 183. It will be recalled that clutch shifter cam 183 is part of the gear and cluster 134 free to rotate on shaft D and is intermittently driven as part of the cluster in a clockwise direction by gear 138. Cam 183 controls the vertical shifting of clutch 181 on shaft H.

Gear system for control of pivoting of chute

Shaft B is intermittently driven in a counterclockwise direction by engagement of pinion 149 (shaft C) with gear 160 resulting in the speed reduction from driver 147 (shaft C) to shaft B. Keyed and axially constrained from shaft B are gear 160, pinion 177, distributor lift cam 187, and signal cam 188. Freely rotating and axially constrained on shaft B is pawl accelerator 157. Gear 160 meshes with pinion 149 and rotates counterclockwise about shaft B. Pinion 177 meshes with gear 138 (shaft D), thereby providing a further speed reduction from shaft B, e.g. 4 to 1 speed reduction, to the gear and cam cluster 134 on shaft D. Gear 138 is part of gear and cam cluster 134 free to rotate on shaft D.

Distributor lift cam 187 keyed to shaft B will rotate intermittently with gear 160. Cam 187 provides the power for the angular motion of distributor lift shaft 100 and is in contact with distributor lift cam follower 189 during a period in which latch 140 and arm 190 are not interlocked.

Distributor lift shaft 100 is rotatably mounted and axially constrained in the lower front section of gear box 32. Keyed and axially constrained to shaft 100 are arm 103, distributor lift cam follower 189 and distributor lift spring arm 142 integral with contact arm 190. Freely rotating and axially constrained on shaft 100 is distributor driver link 97. Distributor driver link 97 and arm 103 are part of the pin distributing mechanism described above. Distributor lift cam follower 189 is adapted to ride on the distributor lift cam 187 and is maintained in a clockwise rotational direction about shaft 100 by the distributor lift spring 193 acting on the distributor lift spring arm 142. Distributor latch 140 rotates freely on shaft A and includes two integrally constructed arms, one of which represents a latch hook 194 having cam follower 141 riding the distributor latch cam 137 and the other of which represents a stop arm 197 which is adapted to contact stop arm 198 to lock out signal cam follower 199 from the signal cam 188 in accordance with the configuration of cam 137. Arm 197 is spring loaded and is adapted to force cam follower 141 to contact cam 137.

Distributor lift spring arm 142, keyed to shaft 100, consists of a forked arm 142 which supports spring pivot block 191 and the contact arm 190. Distributor latch 140 engages contact arm 190 maintaining cam follower 189 out of contact with lift cam 187 from the first through the ninth cycles. Distributor driver link 97 is freely rotatable on shaft 100 and is supported and rotated counterclockwise by pressure arm 103.

Link 97 provides the drive to a four bar linkage of the pin distributing mechanism, which includes driver link 97, follower link 98, and connecting link 99 having the large ring-shaped extension 94 surrounding bucket 41, as described hereinabove.

Spring pivot block 191 is pivotably mounted at one end of distributor lift spring arm 142 and serves as the lower retainer for distributor lift spring 193. Distributor lift spring 193 is guided and axially supported on tube 192 and constrained between spring block 191 and cantilever arm 195. Spring 193 is the energy source for rotating arm 103 (FIGURE 2) counterclockwise about shaft 100. Spring 193 provides the necessary force to lift the heavy load of the four bar linkage, extension 94, guide 55, nine reclining bowling pins and roller 84 against the force exerted by springs 81. Cantilever arm 195 serves as the upper pivot for spring guide tube 192 and as a stop for spring 193.

Signal cam follower 199 freely rotating on shaft A, consists of three integrally constructed arms. Follower 199 carries on one arm thereof the follower roller for the signal cam 188. Arm 18 of follower 199 is provided for contacting stop arm 197 and arm 200 is provided connected to the signal rod 202. Stop arm 197 is adapted to maintain follower 199 from contacting the signal cam 188 or permit contact of follower 199 with cam 188. Arm 200 pulls the signal rod 202 to the right as viewed in FIGURE 11 when follower roller 199 is on the low part of signal cam 188. Signal cam 188, keyed to shaft B, completes four revolutions for each revolution of shaft D. Cam 188 regulates the angular motion of signal cam follower 199. Signal rod 202 connects to a gear box main clutch such as described by Huck et al. in U.S. Patent 2,949,300, entitled "Automatic Pinsetter" each time the signal cam follower 199 causes signal rod 202 to move to the right.

OPERATION OF THE GEAR CONTROL SYSTEM

In general with respect to the operation of the control gear system, the system serves to control the pinsetting mechanism by regulating the distributor for loading of bowling pins into storage and intermediate positions on the stationary deck 23 and for depositing pins from the stationary deck positions into the lower moving deck 22. To this end, the funnel assembly is indexed about its vertical axis to allow the pins to be guided to the proper storage positions with respect to the peripheral positions. The funnel assembly loads the pins into storage positions by indexing the following sequence of pin positions: #2, #4, #7, #8, #9, #10, #6, #3 and #1 in a clockwise direction about the axis of rotation. The funnel indexing to each of the peripheral positions is a separate step and the indexing to the nine peripheral positions in the above order constitutes the first nine steps of regulation by the control gear system.

Three additional steps of control are provided. After the ninth step and after the ninth pin to be distributed has been placed in the #1 pin storage position, during the tenth or #5 pin hold step, lower chute 71 pivots clockwise about pins 80 into an intermediate position holding the tenth pin on the bumper 91. During the eleventh step, i.e. the pin depositing step, the ten pins are simultaneously deposited in the moving deck 22 by further counterclockwise pivoting of lower chute 71 about pin 80 to its lowest position, as described above. The twelfth step or distributor return step consists of returning lower chute 71 to its raised position aligned for delivery to the #1 pin position so the funnel assembly is now ready to index to the #2 pin position for the first step of the next distributor controlled cycle. The description and operation of the control gear system hereinbelow will at times refer to one or more of the twelve steps outlined above.

In the descriptions hereinafter, more particular reference will be made to FIGURES 5 through 11, which illustrate various components of the gear control system in various positions during the twelve steps of operation. For general orientation purposes, the positions of components in each are in accordance with the following: FIGURES 5 through 8 illustrate components at the beginning of the first step of gear control; FIGURES 9 and 10 illustrate components during the last quarter of the twelfth step of gear control; and FIGURE 11 illustrates components immediately before beginning of the first step.

As indicated above, pin gate 51 has three working positions: (1) position #I or the pin sensing position in which pin gate 51 is in its uppermost position for sensing presence of pins; (2) position #II or the pin blocking position in which pin gate 51 is in its intermediate position and blocking the passage of pins; and (3) position #III in which the pin gate 51 permits passage of a pin. The three positions of pin gate 51 correspond to the three positions of follower 161, gear sector 163, fork 162 and anvil 122 (pin gate 51 is interconnected with follower 161 and anvil 122 by means of tie-rod 172a, pivot arm 172, shaft G, gear sector 169, gear sector 163, fork 162 which is an integral part of follower 161, trigger spring 168, spring arm 164 and trigger arm 167 which is an integral part of anvil 122). The construction permits a bowling pin to move pin gate 51 from position I to position II upon contact of a pin with the gate.

Pin gate 51 is in position I prior to the first indexing step with lower chute 71 in its raised position and directed towards the #1 pin position, with no pins against pin stops 62 and with no pins in the distributor mechanism. Pin gate 51 is maintained in position I as long as a bowling pin does not depress the pin gate to position 169. Cam follower 161, with pin gate 51 in position I, rides on the middle of cam 150. Gear sector 163 is against the lower prong of fork 162 and is capable of rotating counterclockwise about shaft F, which rotation will occur when pin gate 51 moves to position II. The cross conveyor belt 50 transports pins toward pin gate 51 as illustrated in FIGURE 2. Since the cross conveyor belt 50 is running constantly, it will push the pins against pin stops 62 thereby urging pin gate 51 in a clockwise rotation about shaft 64. Between each of the first through tenth steps of operation, the pin gate cam 150 makes one revolution per cycle, cam follower 161 rides on the high portion of cam 150 and fork 162 moves sector 163 which in turn moves pin gate 51 to position I blocking the passage of each succeeding pin. Follower 161 then rides on middle portion of cam 150 and pin gate 51 moves to position II. During part of the tenth, during the eleventh, and part of the twelfth steps, pin gate 51 is in position I as a result of pin gate lockout arm follower 144 riding on pin gate lockout sector 143 and fork 162 maintaining gear sector 163 in position I.

Regarding position II of pin gate 51, cam follower 161 rides on the middle portion of pin gate cam 150 at the end of each of the first through ninth and twelfth steps enabling gear sector 163 to rotate counterclockwise about shaft F upon urging of pin gate 51 from position I to position II by a pin. Of course, the indexing mechanism will remain at rest if there is no pin urging against pin stops 62.

To place pin gate 51 in position III, cam follower 161 rides from the middle to the lower portion of cam 150 at the start of each of the first through tenth steps and sector fork 162 urges gear sector 163, which in turn urges pin gate 51 from position II to position III. Further rotation of cam 150 returns pin gate 51 from position III to position I during the middle of each of the first through tenth steps.

Shaft C is continuously rotating, carrying pulse cam 113 and ratchet wheel 114 in a clockwise rotational direction. Whenever pawl 117 is disengaged from wheel 114, the Geneva driver 147, pinion 161, and pin gate cam 150 are held stationary by stop 118.

A one revolution clutch mechanism is provided by the combination of wheel 114, stop 118, pawl 117, driver 147, pinion 161 and pin gate cam 150. This mechanism provides the drive for all output motions.

Prior to first control step

The conditions of the indexing mechanism immediately prior to the first of the twelve steps in the cyclic operation, with pin gate 51 in position I, are as follows: with shaft C, pulse cam 113 and ratchet wheel 114 rotating, follower 161 is about to leave the middle portion of cam 150. Anvil 122 is maintained in position I against the lower prong of fork 162 by trigger spring 168 and sector 163. Pawl stop 118 is latched to pawl 117 and holds pawl 117 from wheel 114 thereby maintaining pin 120 stationary. Pulse cam follower 119 is continuously oscillating up and down about pin 120 in reaction to the rises and drops of the pulse cam 113 and finger 121 missing anvil 122. Chute 71 is in the raised position indexed toward the #1 pin position of the stationary deck 23.

The conditions of the indexing mechanism immediately prior to the first step of operation with pin gate 51 in position II are the same as those with pin gate 51 in position I except that anvil 122 moves to position II as a result of the action of a bowling pin against pin stops 62; finger 121 contacts the top of anvil 160 and follower 119 rises on a rise of cam 113, thereby urging pin 120 to rotate counterclockwise about shaft E with contact arm 126 being held stationary by the eleventh cycle trip arm 127, raising stop 118 which disengages pawl 117; spring 148 urges the latching end of pawl 117 into contact with the outer periphery of wheel 114 for sliding thereon until pawl 117 engages the next slot in wheel 114.

Finger 121 and anvil 122 are adapted so that anvil 122 can slip under finger 121 when follower 119 rides on a drop of cam 113. Since pin action at pin gate 51 and the action of follower 119 on pulse cam 113 are independent of each other, trigger anvil 122 in attempting to follow the angular motion of gear sector 163 could hit the side of finger 121 when follower 119 rides on a rise of cam 113. When this happens, spring 168 elongates and allows sector 163 to rotate counterclockwise. Anvil 122 is urged against oscillating finger 121 by spring 168 until follower 119 rides on a low dwell of cam 113 raising finger 121 and permitting the anvil 122 to rotate under finger 121. When follower 119 rides on a rise of cam 113, finger 121 contacts the top of anvil 122 and the pawl 117 is released.

During first control step

Operation of pin gate

During the first step of operation, pin gate 51 is moved to position II by urging of a pin thereagainst and pawl 117 fully engages wheel 114. In the one-revolution clutch mechanism, the constantly rotating ratchet wheel 114 will now carry the pawl 117 and Geneva driver 147, attached thereto by pin 124, along with it, and pinion 149 and pin gate cam 150 rotates with Geneva driver 147.

The first output motion of the one-revolution clutch mechanism is provided by driver 147 through cam 150 to pin gate 51. Immediately after pawl 117 drives cam 150, follower 161 will drop from the middle to the low portion of cam 150, fork 162 rotates counterclockwise from position II and III and the lower prong of fork 162 urges gear sector 163 and pin gate 51 to position III to permit a bowling pin to pass to the distributor mechanism 52. For just enough time to allow one bowling pin to be released by pin gate 51, follower 161 will remain on the low portion of cam 150, e.g. approximately one-third of a revolution, and anvil 122 and pin gate 51 will remain in position III.

As the pin gate cam 150 rotates through another portion, e.g. approximately the second one-third revolution, it will return follower arm 161 to position I (FIGURE 9). The upper prong of fork 162 will urge sector 163, anvil 122 and pin gate 51 from position III to I, blocking the passage of the succeeding bowling pin. Finger 121 misses anvil 122 thereby allowing spring 123 attached to follower 119 to urge pin 120 counterclockwise about shaft E to its initial stationary position (FIGURE 11), returning the follower 119 to its normal pivoting position about pin 120 and returning stop 118 about shaft E to its downward position.

Stop 118 remains with pin 120 against frame 110 and down in position to stop pawl 117 at the end of one revolution of cam 150. Ratchet pawl 117 will remain latched to wheel 114 for one complete revolution. During the last portion, e.g. one-third of the revolution of wheel 114 while follower 161 is on the high portion of cam 150, stop 118 rides on the outer surface of pawl 117, depressing pawl 117 to the position shown in FIGURE 11. The physical relation of cam 113 to ratchet wheel 114 is such that stop 118 will be lifted at the moment the latching end of pawl 117 (which latches to wheel 114) passes underneath stop 118. Pawl 117 will not disengage from wheel 114 until the instant that the end of stop 118 contacts the radial surface of the spring-loaded latching end of pawl 117. At this instant, pawl 117 is still fully engaged in wheel 114. Spring 148 exerts a counterclockwise moment on the driver 147 through pin 124, attempting to turn driver 147 in that direction. This counterclockwise moment is opposed by the inertia of the parts rotating with pawl 117 and by a force applied by pawl accelerator arm 158 to a cam rise on the face of Geneva driver 147 as shown in FIGURE 11. The cam rise on Genevia driver 147 is so positioned with respect to pawl 117, and the force applied by pawl accelerator 157 (supplied by a spring connected between arm 159 and arm 197) is of such magnitude, that the resulting clockwise moment more than overcomes the counterclockwise moment of spring 148 and allows freedom of disengagement of pawl 117 from a slot in ratchet wheel 114 so that as the tip of pawl 117 slips out of the slot and wheel 114 a diminishing contact area and a constant drive force does not result in a mounting pressure per unit area, tending to damage the edges of both parts.

Control of funnel indexing

The second output motion is provided by driver 147, which converts the single power input to sprocket 112 and shaft C into angular output motions, through Geneva 154. Driver 147 performs one revolution with pawl 117. In one revolution of driver 147, follower 152 engages one of the five slots in Geneva 154 and rotates it counterclockwise one-fifth of a revolution. Follower or roller 152 engages with and drives Geneva 154 when follower 161 rides on the low portion of cam 150, and driver 152 will disengage from Geneva 154 when follower 161 rides on the high portion of cam 150. The rollers $R_1$ and $R_2$ are positioned to maintain Geneva 154 in the position shown in FIGURE 9 during the time that follower 161 rides on the high and middle portions of cam 150. The rotation of Geneva 154 assures fast positioning of the distributor funnel assembly so that the lower chute 71 is directed toward the required bowling pin storage position in the stationary deck 23 prior to the bowling pin leaving the funnel assembly. Each station of wheel 154 represents one indexing step for the distributor funnel assembly and Geneva 154 indexes and comes to a stop near the beginning of each step.

Thus, Geneva 154 keyed to shaft D, rotates shaft D and gear 174 counterclockwise through one-fifth of a revolution during each step. Since gear 174 meshes with gear 178 (rotatably mounted on shaft H) the angular motion of Geneva 154 is transferred to gear 178. During the first through ninth steps, follower 182 rides on the low portion of cam 183 enabling clutch 181 to remain engaged with lower clutch half 179 and shaft H will rotate with gear 178. Engagement of a clutch 181 with clutch 179 enables Geneva 154 to directly drive lower chute 71 through shaft D, gears 174 and 178, the clutch, shaft H, pulley 76 and belt 45. The amount of rotation of shaft D relative to the amount of rotation of lower chute 71 is determined by the ratios between the number of stations in Geneva 154, and the number of teeth in gears 174 and 178, and the pitch diameters of pulley 76 and the pulley on lower chute 71. In this case, one-fifth of a revolution of Geneva 154 results in one-ninth of a revolution of chute 71.

The unit consisting of follower 182, cam 183, arm 180, and clutches 179 and 181 together with spring 185 is a distributor lockout clutch mechanism. This mechanism provides a mechanical means of maintaining lower chute 71 stationary during the tenth, eleventh and twelfth steps, whereas lower chute 71 is indexed through nine positions during the first through ninth steps.

Second through ninth steps

At the end of the first cycle, the indexing mechanism cams 113, 147 and 150 are again in their 0° positions or positions prior to the first step (previously described) and pin gate 51 may be either in position I or II. If there is no bowling pin depressing pin gate 51 from position I to II, the pawl 117 will remain latched to stop 118 and the previously described conditions with pin gate 51 in position I (prior to the first step) will prevail. If a bowling pin is against pin gate 51, the other previously described conditions with pin gate 51 in position II (prior to the first step) will occur, where anvil 122 is in position II and stop 118 releases pawl 117.

When pawl 117 fully engages wheel 114, the second step is started. It should be noted that from the first through the tenth steps it is possible for each step to follow the preceding step without a pause in the action of pin gate 51 providing a bowling pin is always ready to depress pin gate 51 to position II. The previously described action of that output motions of pulley 76 will result in lower chute 71 being directed toward bowling pin position #4 prior to the second bowling pin leaving the funnel assembly.

The first nine steps are identical with the first cycle as far as the action of all of the previously mentioned parts is concerned. The indexing mechanism deposits the first nine bowling pins to their peripheral storage positions in the sequence previously described in the operation of the distributor mechanism. At the end of the ninth step, lower chute 71 is directed toward pin position #1.

Tenth step

In this step, chute 71 will pivot to an intermediate #5 pin hold or storage position, pin gate 51 will move to position I and the turret will be held against indexing.

The third output motion from driver 147 is through pinion 149 to distributor lift arm 97. Pinion 149 makes one revolution per cycle with driver 147, when pawl 117 is engaged with wheel 114 and pinion 149 meshes with gear 160 which is keyed and clamped to shaft B. Engagement of pinion 149 and gear 160 provides a three to one speed reduction from driver 147 to shaft B which means that it requires three rotations of driver 147 to obtain one rotation of shaft B. Keyed to shaft B and rotating with it are gear 160 and pinion 177. Pinion 177 meshes with gear 138, which is part of gear and cam cluster 134, providing a four to one speed reduction from shaft B to shaft D and a twelve to one speed reduction from shaft C to shaft D. Distributor lift latch cam 137, start cam 133, and clutch shifter cam 183 are in the 0° positions prior to the first step and rotate once for twelve revolutions of driver 147 so that at the end of the ninth step each of these cams has rotated three-fourths of a revolution. Nine bowling pins are in their storage position and lower chute 71 is directed toward pin position #3 on stationary deck 23. Follower 141 is about to leave the high portion of cam 137, follower 130 is about to leave the high portion of cam 133, and follower 182 has moved to the high portion of cam 183.

Operation of pin gate

Since follower arm 144 does not contact the pin gate lockout sector 143 until the latter part of the tenth step, pin gate 51 will be able to move to position II and allow the tenth pin to drop into the funnel assembly at the start of the tenth step. After the tenth pin has initiated the tenth step, pin gate lockout sector 143 moves underneath follower arm 144. This occurs during the last portion, e.g. last third, of the tenth step. Ten pins have consequently been released by pin gate 51 by this time and are in their storage positions in the distributor. When follower 144 rides on sector 143, fork 162 maintains pin gate 51 in position I for the latter part of the tenth, all the eleventh, and the early part of the twelfth steps.

Control of funnel indexing

Follower 182 rides on the high portion of cam 183 for the tenth, eleventh and part of the twelfth steps and urges arm 180 upward and disengages clutch 181 from clutch 179, against the action of spring 185. Shaft H is maintained stationary by such disengagement, thus maintaining chute 71 stationary about its center and directed toward the #1 pin position for the tenth, eleventh and twelfth steps.

Lowering of chute to intermediate position

As the tenth step is initiated, follower 141 will ride down to the low portion of cam 137. Latch 140 releases arm 190 for the tenth, eleventh and twelfth steps, thereby enabling follower arm 189 to ride on the high portion of cam 187. Cam 187 rotates once while driver 147 rotates three times. Thus between step 1 and step 9, cam 187 has performed 3 idle revolutions with latch 140 maintaining follower 189 from cam 187. With the beginning of the 10th step, cam 187 starts its 4th revolution. Contact between follower 189 and cam 187 is established. Follower 189 rides to the middle portion of cam 187 and rotates arm 103 and thereby rotates link 97 counterclockwise about shaft 100.

Follower 141 is urged against cam 137 by a spring connecting arm 197 and arm 159. Spring 193 urges follower 189 against cam 187 through block 191 and arm 142. The middle portion of cam 187 and the force exerted by spring 193 raise guides 55 and rotates chute 71 into its intermediate position. When follower 189 is on the middle portion of cam 187 the four bar linkage and associated connecting links pivot funnel chute 71 into its intermediate position prior to the tenth pin leaving the funnel assembly. The tenth pin comes to rest against stop 91 as previously described in the operation of the distributor mechanism. At the end of the 10th step, anvil 122 is in position I, pawl 117 is latched to stop 118 holding driver 147 stationary, and the low portion of the start cam 133 has moved under the start cam follower 130.

Eleventh step

In the eleventh step of the control cycle, the ten pins in the turret are deposited in the moving deck with pivoting of the chute to its lowest position. The 11th step is initiated by other means than pin gate 51 and anvil 122. The 11th step serves to deposit the ten stored bowling pins into moving deck 22. The requirement for depositing of ten pins is that the deck 22 has moved into a predetermined loading position and is ready to receive the full complement of ten pins.

At the start of the 11th step if the deck 22 is not ready to receive ten pins, rod 128 will be maintained to the left by the previously mentioned detector mechanism, and, via arm 129 and link 131, follower 130 will be raised above the low portion of cam 133. Stop 118 remains latched to pawl 117 and the indexing mechanism is stationary. When the deck 22 is ready to receive ten pins, a signal is sent from deck 22 to the detector mechanism which allows rod 128 to be spring urged to the right. Follower 130 then rides on the low portion of cam 133, arm 129 urges shaft E and thus trip arm 127 clockwise. Trip arm 127 urges stop 118, via arm 125, clockwise about shaft E, releasing pawl 117 for one revolution of driver 147.

Driver 147 rotates Geneva 154 for one-fifth of a revolution, but since clutch member 181 is disengaged from clutch member 179 (previously described in the 10th step), no rotation will be imparted to output shaft H. The one revolution of driver 147 and pinion 149 enables follower 189 to ride from the middle to the low portion of cam 187, rotating arm 103 and thus link 97 further counterclockwise about shaft 100. This motion enables bumpers 58 to engage and lift guide piece 55 and roller 84 to pivot chute 71 clockwise about center 80, depositing all ten bowling pins simultaneously into deck 22.

A safety feature is included by employing spring 193 to produce the required lifting energy for the distributor mechanism. If an excessive external force, such as a bowling pin being jammed in the distributor mechanism, should prevent chute 71 from pivoting about center 80 and extension 94 from rising, pressure arm 103 would cease to pivot about shaft 100, spring 193 would not be further extended, and follower 189 will be maintained away from cam 187, thereby avoiding damage to any parts in the indexing mechanism.

Prior to the eleventh step, if the indexing mechanism is ready but the deck 22 is not, signal rod 128 is maintained to the left, stopping the indexing mechanism. If the deck 22 is ready but the indexing mechanism is not, signal rod 128 being maintained to the left, signals the detector mechanism to stop deck 22, e.g. by disengaging the gear box main clutch such as shown by Huck et al., in the above-identified U.S. Patent 2,949,300.

When the indexing mechanism has completed the tenth step signal rod 202 is pulled to the right (FIGURE 11) to re-engage the gear box main clutch and restart deck 22. In accomplishing this, follower 199 rides on the high portion of signal cam 188 during the tenth step and rides to the low portion during the eleventh and twelfth steps. Arm 198 contacts arm 197 until follower 141 rides on the low portion of cam 137, thereby locking follower 199 from cam 188 for the first through ninth steps. Follower 199 is urged against cam 188 by a spring connecting follower 199 and frame 110. When follower 199 rides on the low portion of cam 188 (at the beginning of the eleventh step), arm 200 pivots clockwise about shaft A and pulls rod 202 to the right which re-engages the gear box main clutch for the deck 22 drive mechanism.

Twelfth step

During the twelfth step of operation, the chute is returned to its raised or uppermost position and readied for indexing to the first peripheral pin position to receive a pin, i.e. position #2 as described above, for repeating step #1 in the next cycle of operation. During the twelfth step, follower 130 is still on the low portion of cam 133 and trip 127 maintains stop 118 away from pawl 117. Therefore, the one revolution clutch mechanism performs two consecutive, non-interrupted revolutions and the indexing mechanism does not stop between the eleventh and twelfth steps. Cam 187 rotates through another one-third revolution returning follower 189 to the high portion of cam 187, arm 103 returns to its lowered position allowing link 97 and, therefore, allowing guide piece 55 and chute 71 to return to their original positions. Follower 144 leaves sector 143 and pin gate 51 is free to be urged from position I to II by a bowling pin. Follower 182 rides to the low portion of cam 183. Clutch 181 is urged to engage clutch 179, establishing a direct drive from driver 147 to chute 70. At the end of the twelfth step, follower 141 starts rising to the high portion of cam 137, moving distributor latch 140 into position to engage contact arm 190. Follower 189 is maintained out of contact with cam 187 between the first through ninth steps by latch 140.

The moment that a bowling pin urged pin gate 51 to position II, the indexing mechanism starts on the first step of the next cycle, so that if there is a bowling pin against pin gate 51 at the end of the 12th step, the 1st step will follow the 12th of the prior cycle without a pause.

It is possible to go from the 10th to 11th and 12th steps without a stop if deck 22 is in position to receive ten pins permitting roller 130 at the end of the 10th step to ride on the low portion of cam 133. Therefore, it is possible for the indexing mechanism to go from the 1st through the 12th steps without a pause providing there is a bowling pin depressing pin gate 51 to position II at the start of each of the 1st through 10th steps and deck 22 is in position to receive the ten pins prior to the 11th step.

We claim:

1. A pin distributing mechanism, comprising: a conveyor for conveying pins toward a pin discharge station; a pin gate at the discharge station movable between an upper pin sensing position, an intermediate pin blocking position, and a lower pin passing position; means normally urging the pin gate to said pin sensing position; means mounting said pin gate for movement from sensing to intermediate blocking position responsive to a pin engaging said gate; a pin distributor at said discharge station and having an indexable chute for receiving pins one at a time from the conveyor, means mounting the distributor chute for step by step indexing movement about an upright axis to deliver pins to a plurality of pin positions spaced around said axis; a continuously rotating power input shaft; a one revolution clutch mechanism engageable to index said chute; and actuating means driven by said clutch for positively moving said pin gate to pin passing position and indexing said chute about said upright axis when said gate is in intermedate blocking position and preventing movement of said gate to pin passing position and indexing of said chute when said gate is in pin sensing position.

2. The mechanism of claim 1 wherein said actuating means comprises latching means retaining said clutch releasably disengaged when said pin gate is in pin sensing position and releasing said clutch for engagement when said gate is in intermediate blocking position.

3. The mechanism of claim 2 wherein said latching means has a cyclically operable portion normally maintaining said clutch releasably disengaged, and a stop portion normally out of operative engagement with said cylically operable portion and engaging said cylically operable portion responsive to said pin gate moving from sensing position to intermediate blocking position to hold said cyclically portion and thereby release said clutch.

4. A pin distributing mechanism, comprising: a conveyor for conveying pins toward a pin discharge station; a pin gate at the discharge station movable between a pin sensing position, an intermediate blocking position, and a pin passing position; means normally urging the pin gate to said pin sensing position; means mounting said pin gate for movement from sensing to intermediate blocking position responsive to a pin engaging said gate; and cyclically operable driven means responsive to movement of the pin gate from pin sensing position to pin blocking position for moving the pin gate from blocking position to passing position.

5. A cyclically operable pin distributing mechanism, comprising: a conveyor for conveying pins toward a pin discharge station; a pin gate at the discharge station movable between a pin blocking position and a pin passing position; a pin distributor at said discharge station for receiving pins one at a time from the conveyor, means mounting the distributor for step by step indexing movement about an upright axis to deliver pins to a plurality of pin positions spaced around said axis; a continuously rotating power input shaft; a one revolution clutch mechanism engageable to index said distributor; and actuating means driven by said clutch for indexing said distributor when said gate is in blocking position and then positively moving said pin gate to pin passing position.

References Cited

UNITED STATES PATENTS

| | | |
|---|---|---|
| 1,692,796 | 11/1928 | Bishop. |
| 1,911,436 | 5/1933 | Cone _____ 273—43 |
| 2,967,708 | 1/1961 | Huck et al. _____ 273—43 |
| 3,014,721 | 12/1961 | Albrecht et al. |
| 3,239,221 | 3/1966 | Dowd et al. |

ANTON O. OECHSLE, Primary Examiner